(12) United States Patent
Grillot et al.

(10) Patent No.: US 12,068,781 B2
(45) Date of Patent: Aug. 20, 2024

(54) SYSTEM AND METHOD FOR SECURED FREE SPACE OPTICAL TRANSMISSION IN THE MID-INFRARED DOMAIN

(71) Applicants: INSTITUT MINES TELECOM, Palaiseau (FR); MIRSENSE, Palaiseau (FR)

(72) Inventors: Frédéric Grillot, Versailles (FR); Olivier Spitz, Montrouge (FR)

(73) Assignees: INSTITUT MINES TELECOM, Palaiseau (FR); MIRSENSE, Palaiseau (FR)

( * ) Notice: Subject to any disclaimer, the term of this patent is extended or adjusted under 35 U.S.C. 154(b) by 0 days.

(21) Appl. No.: 17/784,641

(22) PCT Filed: Dec. 8, 2020

(86) PCT No.: PCT/EP2020/084986
§ 371 (c)(1),
(2) Date: Jun. 11, 2022

(87) PCT Pub. No.: WO2021/116060
PCT Pub. Date: Jun. 17, 2021

(65) Prior Publication Data
US 2023/0009914 A1  Jan. 12, 2023

(30) Foreign Application Priority Data

Dec. 13, 2019 (EP) ..................................... 19306650

(51) Int. Cl.
H04B 10/00 (2013.01)
H04B 10/112 (2013.01)
(Continued)

(52) U.S. Cl.
CPC ............ *H04B 10/112* (2013.01); *H04L 9/001* (2013.01); *H04L 9/0852* (2013.01); *H04L 9/12* (2013.01)

(58) Field of Classification Search
CPC .............. H04B 10/112; H04B 10/1123; H04B 10/114; H04B 10/1143; H04B 10/40;
(Continued)

(56) References Cited

U.S. PATENT DOCUMENTS

| 11,398,714 | B2 * | 7/2022 | Piccardo | H01S 5/0657 |
| 2002/0085255 | A1 * | 7/2002 | Gavish | H04B 10/1121 398/140 |
| 2002/0097471 | A1 * | 7/2002 | Bethea | H04B 10/1121 398/121 |

FOREIGN PATENT DOCUMENTS

CN  207 743 559 U  8/2018

OTHER PUBLICATIONS

Soibel, et al., "Mid-infrared interband cascade laser for free space optical communication", IEEE Photonics Technology Letters, vol. 22, No. 2, pp. 121-123, 2009.
(Continued)

Primary Examiner — Hanh Phan
(74) Attorney, Agent, or Firm — BakerHostetler

(57) ABSTRACT

A free-space optical communication system includes a transmitter and a receiver, the transmitter being configured to transmit an encrypted message to the receiver at the mid-infrared domain, the transmitter comprising a master mid-infrared optical source configured to generate a mid-infrared signal and a chaos generator configured to generate a chaotic signal by applying external optical feedback to the master mid-infrared optical source, the transmitter being configured to determine an encrypted message from an original message by applying a message encryption technique to the original message and to send the encrypted message to the
(Continued)

receiver through an optical isolator, the receiver comprising a slave mid-infrared optical source similar to the master mid-infrared optical source the slave mid-infrared optical source being configured to recover the chaotic signal from the encrypted message by applying chaos synchronization, the receiver further comprising a first detector configured to detect the encrypted message, a second detector configured to detect the chaotic signal, and a message recovery unit configured to recover the original message from the encrypted message detected by the first detector and the chaotic signal detected by the second detector.

11 Claims, 2 Drawing Sheets

(51) Int. Cl.
  *H04L 9/00* (2022.01)
  *H04L 9/08* (2006.01)
  *H04L 9/12* (2006.01)
(58) Field of Classification Search
  CPC .............. H04B 10/116; H04B 10/2507; H04B 10/118; H04B 10/1125; H04B 10/1127; H04L 9/001; H04L 9/0852; H04L 9/12
  USPC ....... 398/118, 119, 120, 121, 122, 123, 124, 398/125, 126, 127, 128, 129, 130, 131, 398/135, 136, 158, 159, 172; 375/130, 375/316, 295, 317, 141, 146; 380/255, 380/260, 263
  See application file for complete search history.

(56) References Cited

OTHER PUBLICATIONS

Martini, et al., "High-speed modulation and free-space optical audio/video transmission using quantum cascade asers", Electronics Letters, vol. 37, No. 3, pp. 191-193, 2001.
Buttler, et al., "Daylight quantum key distribution over 1.6km", Physical Review Letters, vol. 84, No. 24, p. 5652, 2000.
Su, et al., "10 Gbps DPSK transmission over free-space link in the mid-infrared", Optics express, vol. 26, No. 26, pp. 34515-34528, 2018.
Hao, et al., "Mid-infrared transmitter and receiver modules for free-space optical communication", Applied Optics, vol. 56, Issue 8, pp. 2260-2264, 2017.
Liu, et al., "Synchronized chaotic optical communications at high bit rates", IEEE Journal of Quantum Electronics, vol. 38, Issue: 9, pp. 1184-1196, 2002.
Pang, et al., "Gigabit free-space multi-level signal transmission with a mid-infrared quantum cascade laser operating at room temperature", Optics letters, vol. 42, No. 18, pp. 3646-3649, 2017.
Chiarello, et al., "Securing Wireless Infrared Communications Through Optical Chaos", IEEE Photonics Technology Letters, vol. 23, Issue 9, pp. 564-566, May, 1, 2011.
Kaddoum, "Wireless Chaos-Based Communication Systems: A Comprehensive Survey", IEEE Access, vol. 4, pp. 2621-2648, May 25, 2016.

* cited by examiner

SYSTEM AND METHOD FOR SECURED FREE SPACE OPTICAL TRANSMISSION IN THE MID-INFRARED DOMAIN

CROSS-REFERENCE TO RELATED APPLICATIONS

This application is a National Stage of International patent application PCT/EP2020/084986, filed on Dec. 8, 2020, which claims priority to foreign European patent application No. EP 19306650.3, filed on Dec. 13, 2019, the disclosures of which are incorporated by reference in their entirety.

TECHNICAL FIELD

The invention relates in general to the field of optoelectronics and secure communications, and in particular to free-space communications secured by chaos with optical transmission in the mid-infrared.

BACKGROUND

Free-space optical communications use light propagating in free space (i.e. air, outer space, vacuum, or similar medium) to wirelessly transmit data for telecommunications or computer networking. Free-space optical communication technologies are used where the physical connections are impractical due for example to high costs.

Free-space optical links can be implemented using mid-infrared laser light. In particular, the mid-infrared domain is of prime importance for free-space communications due to the high transparency of the atmosphere. The mid-infrared domain is also more adequate than near-infrared wavelengths because detrimental factors, such as divergence and scintillation, are reduced at higher wavelengths. With the recent accelerated advances in mid-infrared semiconductor lasers such as quantum cascade lasers (QCLs) and the progress in Mercury-Cadmium-Telluride (MCT) photo-diodes, low sized, low weight, and energy efficient optical systems operating at room temperature in the mid-infrared have been developed.

Recent experiments have been conducted in relation with data transmissions in the mid-infrared domain. Communications up to 70 Mbits/s were demonstrated with interband cascade lasers as disclosed in "A. Soibel, M. W. Wright, W. H. Farr, S. A. Keo, C. J. Hill, R. Q. Yang, and H. Liu, Mid-infrared interband cascade laser for free space optical communication, IEEE Photonics Technology Letters, vol. 22, no. 2, pp. 121-123, 2009". Transmissions at several Gbits/s were achieved with frequency down and up-conversion between 1550 nm and 3594 nm as disclosed in "Y. Su, W. Wang, X. Hu, H. Hu, X. Huang, Y. Wang, J. Si, X. Xie, B. Han, H. Feng et al., 10 Gbps DPSK transmission over free-space link in the mid-infrared, Optics express, vol. 26, no. 26, pp. 34 515-34 528, 2018".

Transmissions at similar high speeds using quantum cascade lasers have been reported at room and cryogenic temperatures with a free-space television link application as disclosed respectively in "X. Pang, O. Ozolins, R. Schatz, J. Storck, A. Udalcovs, J. R. Navarro, A. Kakkar, G. Maisons, M. Carras, G. Jacobsen et al., Gigabit free-space multi-level signal transmission with a mid-infrared quantum cascade laser operating at room temperature, Optics letters, vol. 42, no. 18, pp. 3646-3649, 2017" and "R. Martini, C. Gmachl, J. Falciglia, F. G. Curti, C. G. Bethea, F. Capasso, E. A. Whittaker, R. Paiella, A. Tredicucci, A. L. Hutchinson et al., High-speed modulation and free-space optical audio/video transmission using quantum cascade lasers, Electronics Letters, vol. 37, no. 3, pp. 191-193, 2001".

In terms of secure communications, quantum cryptography systems with quantum key distribution (QKD) have been a candidate of choice with free-space sources emitting in the visible spectrum, as disclosed for example in "W. T. Buttler, R. J. Hughes, S. K. Lamoreaux, G. L. Morgan, J. E. Nordholt, and C. G. Peterson, Daylight quantum key distribution over 1.6 km, Physical Review Letters, vol. 84, no. 24, p. 5652, 2000". However, quantum cryptography is not versatile to every kind of secure free-space communication applications such as mid-infrared domain applications and faces several implementation challenges comprising data transmission rate, transmission distances, and the implementation costs. There is accordingly a need for secured free-space optical communication systems in the mid-infrared domain.

SUMMARY

In order to address these and other problems, there is provided a free-space optical communication system comprising a transmitter and a receiver, the transmitter being configured to transmit an encrypted message to the receiver at the mid-infrared domain. The transmitter comprises a master mid-infrared optical source configured to generate a mid-infrared signal and a chaos generator configured to generate a chaotic signal by applying external optical feedback to the master mid-infrared optical source. The transmitter is configured to determine an encrypted message from an original message by applying a message encryption technique to the original message and to send the encrypted message to the receiver through an optical isolator. The receiver comprises a slave mid-infrared optical source similar to the master mid-infrared optical source. The slave mid-infrared optical source is configured to recover the chaotic signal from the encrypted message by applying chaos synchronization. The receiver further comprises a first detector configured to detect the encrypted message, a second detector configured to detect the chaotic signal, and a message recovery unit configured to recover the original message from the encrypted message detected by the first detector and the chaotic signal detected by the second detector.

According to some embodiments, the chaos generator may comprise a feedback reflector and a mid-infrared polarizer.

According to some embodiments, external optical feedback may be obtained using one or multiple round-trips between the feedback reflector and the emitting facet of the master mid-infrared optical source.

According to some embodiments, the chaos generator may further comprise an injector laser configured to perform optical injection on the mid-infrared signal.

According to some embodiments, external optical feedback may use phase-conjugate feedback.

According to some embodiments, external optical feedback may use rotated polarization feedback.

According to some embodiments, the message encryption technique may be chosen in a group comprising chaos masking, chaos modulation, and chaos shift keying.

According to some embodiments in which the message encryption technique is chaos masking, the transmitter may be configured to determine the encrypted message by adding the original message and the chaotic signal, the message recovery unit being configured to recover the original message by subtracting the chaotic signal detected by the second detector from the encrypted message detected by the first detector.

According to some embodiments, the master mid-infrared optical source and the slave mid-infrared optical source may be mid-infrared semiconductor lasers chosen in a group comprising mid-infrared Quantum Cascade Lasers, Interband Cascade Lasers.

According to some embodiments, the master mid-infrared optical source may be selected depending on the application of the free-space optical communication system and/or on the data rate of the original message.

According to some embodiments, the free-space optical communication system may further comprise a mid-infrared telescope.

There is also provided a method for free-space optical communication between a transmitter and a receiver, an encrypted message being sent from the transmitter to the receiver at the mid-infrared domain, the method comprising the steps consisting in:
- generating an mid-infrared signal at the transmitter using a master mid-infrared optical source;
- determining a chaotic signal at the transmitter by applying external optical feedback to the master mid-infrared optical source;
- determining an encrypted message from an original message by applying a message encryption technique to the original message;
- sending the encrypted message to the receiver through an optical isolator;
- recovering the chaotic signal at a slave mid-infrared optical source comprised in the receiver from the encrypted message by applying chaos synchronization, the slave mid-infrared optical source being similar to the master mid-infrared optical source;
- detecting the encrypted message at a first detector comprised in the receiver;
- detecting the chaotic signal at a second detector comprised in the receiver, and
- recovering the original message at the receiver from the encrypted message detected by the first detector and the chaotic signal detected by the second detector.

Advantageously, the embodiments of the invention provide secured communications at mid-infrared domain using free-space optical chaos synchronization and communications.

Advantageously, the embodiments of the invention enable combining the high degree of protection offered by chaos with the possibility of transmission into the atmosphere, including under degraded conditions, offered by mid-infrared optics.

Advantageously, Quantum Cascade Lasers and Interband Cascade Lasers under external optical feedback provide sustained and complex chaos at mid-infrared wavelengths.

Advantageously, combining optical injection and external optical feedback techniques enable increasing the bandwidth of chaos of mid-infrared semiconductor lasers.

Further advantages of the present invention will become clear to the skilled person upon examination of the drawings and the detailed description.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention provide secured free-space communication system and method enabling secured free-space communications with optical transmission in the mid-infrared domain using mid-infrared optical sources. Secured free-space communications according to the embodiments of the invention rely on the use of chaotic optical communications that provide a high degree of protection.

The embodiments of the invention may be implemented in any free-space optical system operating in the mid-infrared domain and employed for mid-infrared data transmission in a diverse range of communication applications comprising, without limitations:
- short-range communications such as wireless body area networks and wireless personal area network applications;
- medium range indoor mid-infrared for wireless local area networks and inter-vehicular and vehicle-to-infrastructure communications in intelligent transport systems;
- long-range communications such as inter-building connections (e.g. Local Area Network-to-Local Area Network connections on campuses, in cities, or in metropolitan area networks);
- ultra-long range communications such as laser communications in space for inter-satellite links and establishment of satellite constellations.

Figure 1:
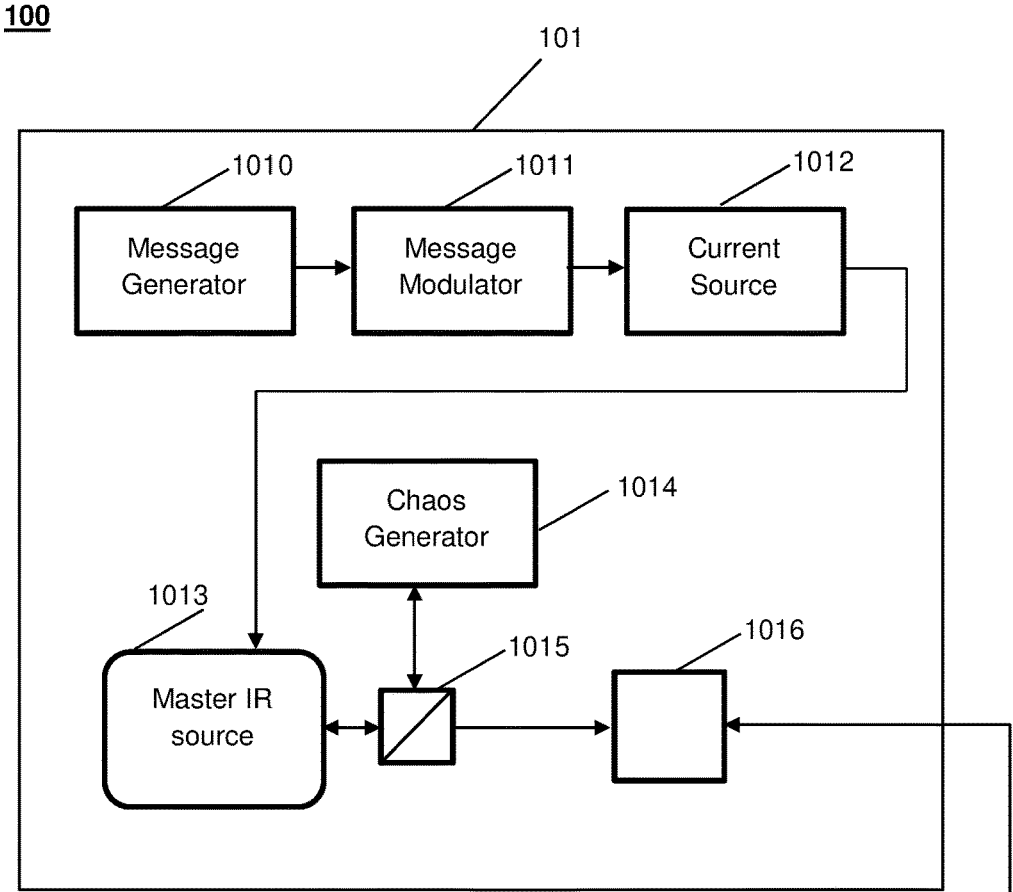
FIG. 1 represents a schematic diagram of a free-space communication system, according to some embodiments of the invention.
Figure 1:
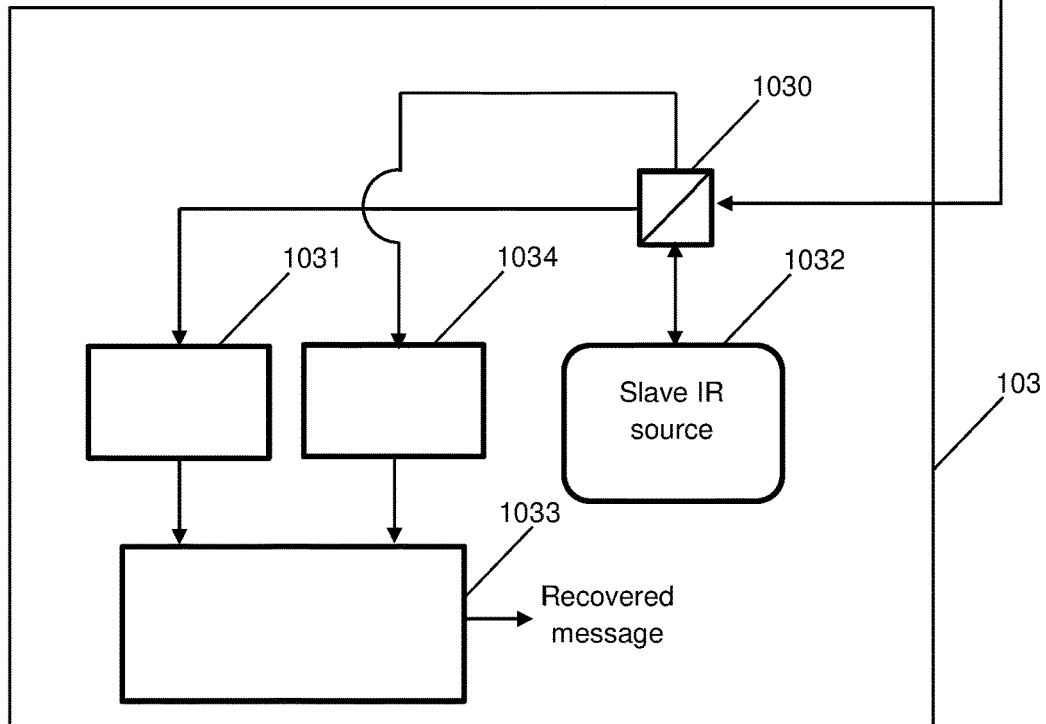

Referring to FIG. 1, there is illustrated a free-space optical communication system 100 according to the embodiments of the invention, in which a transmitter 101 is configured to transmit mid-infrared data to a receiver 103. The communication between the transmitter 101 and the receiver 103 is performed at mid-infrared wavelengths varying from 2 µm, above the visible spectrum, to 20 µm which corresponds to the limit with the terahertz regime.

According to some embodiments, the transmitter 101 and the receiver 103 may be implemented in devices or systems or objects configured to operate in the mid-infrared domain such as, without limitation, ground stations, vehicles, aircrafts, space-crafts, and computer peripherals. The devices implementing the transmitter 101 and the receiver 103 may be fixed or mobile (e.g. aircrafts or vehicles).

Secured free-space communications according to the embodiments of the invention rely on chaos synchronization and communications. Accordingly, messages generated at the transmitter 101 are hidden within chaotic signals generated at the transmitter 101 so that the messages do not disturb the larger chaotic fluctuations and remain well concealed from an eavesdropper. Chaos synchronization and communication according to the embodiments of the invention is based on two mid-infrared optical sources: a master mid-infrared optical source 1013 implemented at the transmitter 101 and a slave mid-infrared optical source 1032 implemented at the receiver 103. The master mid-infrared optical source 1013 is configured to generate a mid-infrared signal. The slave mid-infrared optical source 1032 is similar to the master mid-infrared optical source 1013 and differs from the master mid-infrared optical source 1013 in that the slave mid-infrared optical source 1032 may or may not be chaotic. The messages to be transmitted by the transmitter 101 are thus encoded within a chaotic carrier (also referred to as a 'chaotic signal') denoted by c(t). The chaotic signal may be then injected into the slave mid-infrared optical source 1032 that operates under similar conditions as the master mid-infrared optical source 1013. The slave mid-infrared optical source 1032 synchronizes to the chaos of the master mid-infrared optical source 1013. Then the original message may be recovered from the input and the output of the receiver 103.

According to some embodiments, the master mid-infrared optical source 1013 may be modulated using a near-infrared laser (not illustrated in FIG. 1).

More specifically, with reference to FIG. 1, the transmitter 101 may comprise a message generator 1010 configured to generate a message and a message modulator 1011 configured to determine a modulated message by applying a modulation scheme to the message generated by the message generator. The transmitter 101 comprises a current source 1012 that may be configured to determine an original message denoted m(t) from the modulated message. The modulation scheme may be chosen among a group comprising On-Off-Keying (OOF) modulation schemes and Pulse Amplitude Modulation (PAM) schemes.

According to some embodiments, the current source 1012 may be a low-noise source delivering a continuous bias that may be modulated with an external signal (not illustrated in FIG. 1) from a waveform generator. The low-noise source may further comprise filters (e.g. low pass filter).

According to some embodiments, the modulated message may be introduced through a bias-tee (not illustrated in FIG. 1) in parallel to the current source bias 1012.

According to the embodiments of the invention, the master mid-infrared optical source 1013 may be chaotic by applying external optical feedback. Accordingly, the transmitter 101 may further comprise a chaos generator 1014 configured to generate a chaotic signal c(t) by applying external optical feedback to the master mid-infrared optical source.

The transmitter 101 may be then configured to determine an encrypted message denoted e(t) from the original message m(t) by applying a message encryption technique to the original message m(t).

The transmitter 103 may be then configured to send the encrypted message e(t) to the receiver 103 through an optical isolator 1016 so that back-reflections are avoided. The transmitter 103 may comprise a beam splitter 1015 used to split the laser beams in the directions of the chaos generator 1014 and the optical isolator 1016. The beam splitter 1015 may be a non-polarizing beam splitter.

According to some embodiments, the transmitter 101 may further comprise a lens (not illustrated in FIG. 1) in front of the master mid-infrared optical source 1013. In such embodiments, the beam splitter 1015 may be configured to split the focused laser beams into the directions of the chaos generator 1014 and the optical isolator 1016.

The receiver 103 may be configured to receive the encrypted message e(t). More specifically, the receiver 103 comprises a slave mi-infrared optical source 1032 similar to the master mi-infrared optical source 1013, the slave mid-infrared optical source 1032 being configured to recover the chaotic signal c(t) from the received encrypted message e(t) by applying chaos synchronization. Chaos synchronization occurs when the output of the master mid-infrared optical source is uni-directionally injected into the slave mid-infrared optical source 1032. The slave mid-infrared optical source 1032 synchronizes only with the chaotic fluctuations. The synchronization describes how the receiver 103 is capable of following the dynamical properties of the transmitter 101. The receiver 103 may further comprise a first detector 1031 configured to detect the encrypted message e(t) and a second detector 1034 configured to detect the chaotic signal c(t). The first detector 1031 and/or the second detector 1034 may be a mid-infrared detector (e.g. a Mercury-Cadmium-Telluride (MCT) detector or a Quantum Well Infrared Photodetector (QWIP)). The receiver 103 may further comprise a message recovery unit 1033 configured to recover the original message m(t) from the encrypted message e(t) detected by the first detector 1031 and the chaotic signal c(t) detected by the second detector 1034.

According to some embodiments, the chaos generator 1014 may comprise a feedback reflector and a mid-infrared polarizer (not illustrated in FIG. 1), external optical feedback being obtained using one or multiple round-trips between the feedback reflector and the emitting facet of the master mid-infrared optical source 1013. The feedback reflector and the emitting facet of the master mid-infrared optical source 1013 define the external cavity length L. External optical feedback consists in re-injecting a part of the emitted light by the master mid-infrared optical source 1013 back into the master mid-infrared optical source 1013. The mid-infrared polarizer is a device adapted to tune the amount of optical feedback, the angle of the mid-infrared polarizer defines the feedback strength. According to some embodiments, optical feedback may be combined with optical injection to improve non-linear dynamics of the master mid-infrared optical source 1013 and as a consequence improve the bandwidth of the chaos determined from the master mid-infrared optical source 1013 and the speed of secure transmissions. In such embodiments, the chaos generator 1014 may further comprise an injector laser (not illustrated in FIG. 1) configured to perform optical injection on the master mid-infrared optical source 1013.

According to some embodiments, external optical feedback may use phase-conjugate feedback techniques.

According to other embodiments, external optical feedback may use rotated polarization feedback techniques.

Phase-conjugate feedback techniques and rotated polarization feedback techniques enable modifying the feedback light when it travels in the external cavity.

According to some embodiments, the message encryption technique may be chosen in a group comprising chaos masking, chaos modulation, and chaos shift keying.

In embodiments in which the message encryption technique is chaos masking, the transmitter 101 may be configured to determine the encrypted message e(t)=m(t)+c(t) by adding the original message m(t) and the chaotic signal c(t), the message recovery unit 1033 being configured to recover the original message m(t) by subtracting the chaotic signal c(t) detected by the second detector 1034 from the encrypted message e(t)=m(t)+c(t) detected by the first detector 1031.

According to some embodiments, the master mid-infrared optical source 1013 and the slave mid-infrared optical source 1032 may be mid-infrared semiconductor lasers chosen in a group comprising mid-infrared Quantum Cascade Lasers, Interband Cascade Lasers.

According to some embodiments, the master mid-infrared optical source 1013 may be selected depending on the application of the free-space optical communication system 100 and/or on the data rate of the original message m(t).

According to some embodiments, the free-space optical communication system 100 may further comprise a mid-infrared telescope (not illustrated in FIG. 1) used to propagate the laser beams from the master mid-infrared optical source 1013 over long distances.

According to some embodiments, the free-space optical communication system 100 may further comprise forward error correction encoders/decoders and/or further components such as future mid-infrared optical fibers (e.g chalcogenide optical fibers), optical amplifiers (e.g. mid-infrared SOA), and filters (e.g. low-pass filters).

Figure 2:
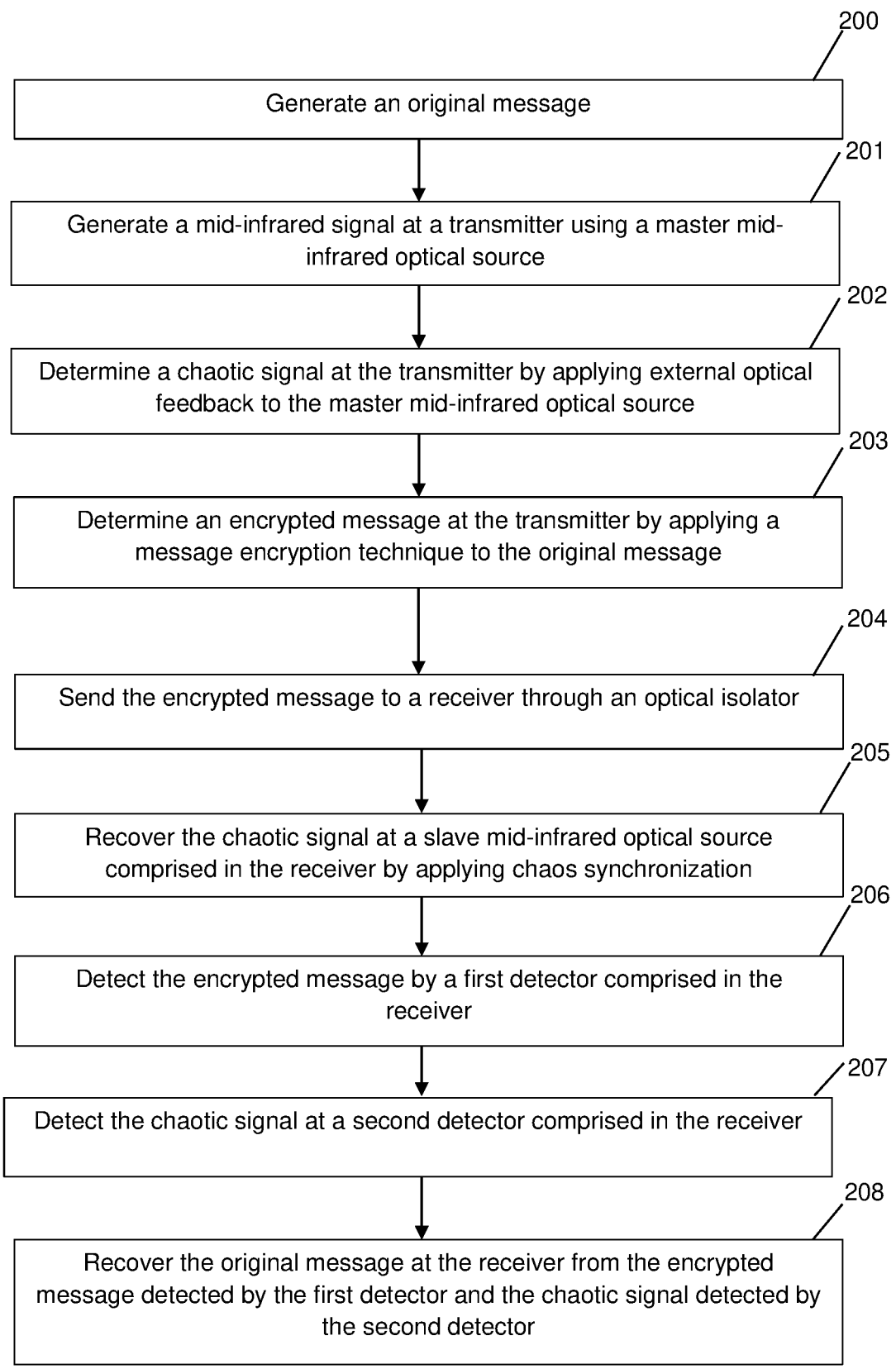
FIG. 2 is a flowchart illustrating a method for free-space communication, according to some embodiments of the invention.

With reference to FIG. 2, the embodiments of the invention provide a method for free-space optical communication between a transmitter and a receiver, an encrypted message being sent from the transmitter to the receiver at the mid-infrared domain, encrypted transmission being achieved using chaos synchronization and communications.

At step 200, an original message m(t) may be generated. The original message may be previously determined from a message that is modulated by applying a modulation scheme and processed by a current source. The modulation scheme may be chosen among a group comprising On-Off-Keying (OOF) modulation schemes and Pulse Amplitude Modulation (PAM) schemes.

According to some embodiments, the modulated message may be processed by a bias-tee in parallel to the current source.

At step 201, a mid-infrared signal may be generated at the transmitter using a master mid-infrared optical source. According to some embodiments, the master mid-infrared optical source may be modulated using a near-infrared laser.

At step 202, a chaotic signal c(t) may be determined at the transmitter by applying external optical feedback on the master mid-infrared optical source.

According to some embodiments, external optical feedback may be performed using one or multiple round-trips between a feedback reflector and the emitting facet of the master mid-infrared optical source, external optical feedback being achieved using the feedback reflector and a mid-infrared polarizer adapted to adjust the strength of the feedback light. According to some embodiments, optical feedback may be combined with optical injection performed using an injector laser.

According to some embodiments, external optical feedback may use phase-conjugate feedback techniques.

According to other embodiments, external optical feedback may use rotated polarization feedback techniques.

Phase-conjugate feedback techniques and rotated polarization feedback techniques enable modifying the feedback light when it travels in the external cavity.

At step 203, an encrypted message e(t) may be determined at the transmitter from the original message m(t) by applying a message encryption technique to the original message.

According to some embodiments, the message encryption technique may be chosen in a group comprising chaos masking, chaos modulation, and chaos shift keying.

In embodiments in which the message encryption technique is chaos masking, the encrypted message e(t)=m(t)+c(t) may be determined at step 203 by adding the original message m(t) and the chaotic signal c(t).

At step 204, the encrypted message e(t) may be sent to the receiver through an optical isolator.

At step 205, to the chaotic signal may be recovered at a slave mid-infrared optical source comprised in the receiver by applying chaos synchronization, the slave mid-infrared optical source being similar to the master mid-infrared optical source comprised in the transmitter.

At step 206, the encrypted message may be detected by a first detector comprised in the receiver.

At step 207, the chaotic signal c(t) may be detected at source second detector comprised in the receiver.

At step 208, the original message m(t) may be recovered at the receiver from the encrypted message e(t) detected by the first detector and the chaotic signal c(t) detected by the second detector.

In embodiments using chaos masking, the original message m(t) may be recovered at step 208 by subtracting the chaotic signal c(t) detected by the second detector from the encrypted message e(t)=m(t)+c(t) detected by the first detector.

According to some embodiments, the master mid-infrared optical source and the slave mid-infrared optical source may be mid-infrared semiconductor lasers chosen in a group comprising mid-infrared Quantum Cascade Lasers, interband cascade lasers.

According to some embodiments, the master mid-infrared optical source may be selected depending on the application of the free-space optical communication system and/or on the data rate of the original message m(t).

According to some embodiments, the laser beams sent by the transmitter may propagate through a mid-infrared telescope.

While the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art.

Further, in certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The invention claimed is:

1. A free-space optical communication system comprising a transmitter and a receiver, the transmitter being configured to transmit an encrypted message to the receiver at the mid-infrared domain, wherein:

the transmitter comprises a master mid-infrared optical source configured to generate a mid-infrared signal and a chaos generator configured to generate a chaotic signal by applying external optical feedback to said master mid-infrared optical source, said chaos generator comprising a feedback reflector and a mid-infrared polarizer, the transmitter being configured to determine an encrypted message from an original message by applying a message encryption technique to said original message and to send said encrypted message to said receiver through an optical isolator, the receiver comprising a slave mid-infrared optical source similar to said master mid-infrared optical source, said slave mid-infrared optical source being configured to recover the chaotic signal from the encrypted message by applying chaos synchronization, the receiver further comprising a first detector configured to detect the encrypted message, a second detector configured to detect the chaotic signal, and a message recovery unit configured to recover the original message from the encrypted message detected by said first detector and the chaotic signal detected by said second detector.

2. The free-space optical communication system of claim 1, wherein said external optical feedback is obtained using one or multiple round-trips between the feedback reflector and the emitting facet of the master mid-infrared optical source.

3. The free-space optical communication system of claim 1, wherein said chaos generator further comprises an injector laser configured to perform optical injection on said mid-infrared signal.

4. The free-space optical communication system of claim 1, wherein said external optical feedback uses phase-conjugate feedback.

5. The free-space optical communication system of claim 1, wherein said external optical feedback uses rotated polarization feedback.

6. The free-space optical communication system of claim 1, wherein said message encryption technique is chosen in a group comprising chaos masking, chaos modulation, and chaos shift keying.

7. The free-space optical communication system of claim 6, wherein the message encryption technique is chaos masking, the transmitter being configured to determine said encrypted message by adding the original message and the chaotic signal, the message recovery unit being configured to recover the original message by subtracting the chaotic signal detected by the second detector from the encrypted message detected by said first detector.

8. The free-space optical communication system of claim 1, wherein the master mid-infrared optical source and the slave mid-infrared optical source are mid-infrared semiconductor lasers chosen in a group comprising mid-infrared Quantum Cascade Lasers, interband cascade lasers.

9. The free-space optical communication system of claim 1, wherein said master mid-infrared optical source is selected depending on the application of the free-space optical communication system and/or on the data rate of said original message.

10. The free-space optical communication system of claim 1, wherein the free-space optical communication system further comprises a mid-infrared telescope.

11. A method for free-space optical communication between a transmitter and a receiver, an encrypted message being sent from the transmitter to the receiver at the mid-infrared domain, wherein the method comprises the steps consisting in:

generating a mid-infrared signal at the transmitter using a master mid-infrared optical source;

determining a chaotic signal at the transmitter by applying external optical feedback to said master mid-infrared optical source, wherein the chaotic signal is generated by a chaos generator, said chaos generator comprising a feedback reflector and a mid-infrared polarizer;

determining an encrypted message from an original message by applying a message encryption technique to said original message;

sending said encrypted message to the receiver through an optical isolator;

recovering the chaotic signal at a slave mid-infrared optical source comprised in said receiver from the encrypted message by applying chaos synchronization, said slave mid-infrared optical source being similar to said master mid-infrared optical source;

detecting the encrypted message at a first detector comprised in said receiver;

detecting the chaotic signal at a second detector comprised in said receiver;

recovering the original message at the receiver from the encrypted message detected by said first detector and the chaotic signal detected by said second detector.

* * * * *